C. J. CARTISSER.
PROCESS OF ORNAMENTING GLASS.
No. 192,679.                    Patented July 3, 1877.
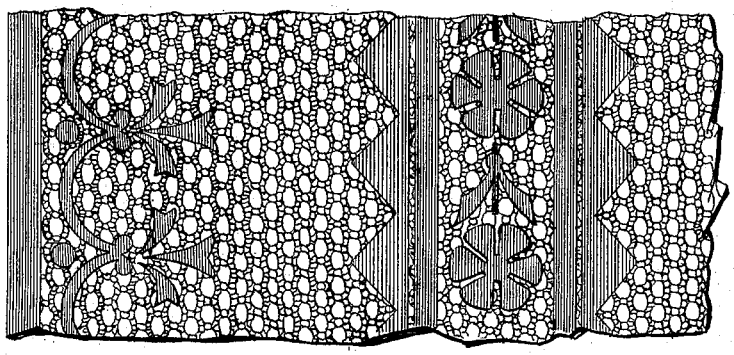

UNITED STATES PATENT OFFICE.

CHARLES J. CARTISSER, OF NEW YORK, N. Y.

IMPROVEMENT IN THE PROCESSES OF ORNAMENTING GLASS.

Specification forming part of Letters Patent No. 192,679, dated July 3, 1877; application filed October 23, 1876.

*To all whom it may concern:*

Be it known that I, CHARLES J. CARTISSER, of the city, county, and State of New York, have invented a new and Improved Process for Ornamenting Glass, of which the following is a specification:

The accompanying drawing represents a piece of glass ornamented by my improved process.

The object of my invention is to furnish an improved process or method of etching glass in ornamental manner, so that a variety of artistic effects may be produced in a quicker, cheaper, and more perfect manner than by the method at present applied in the art.

The invention consists, mainly, in dispensing with the frosting of the glass by mechanical means, as emery, sand, &c., and producing, first, a prepared surface or ground in clear or whitish color by etching the surface with hydrofluoric acid alone, or by a mixture of carbonate of ammonia and hydrofluoric acid, and laying then on this ground any desired ornamentation by means of a varnished transfer-pattern or sheet of lace, or other perforated or cut material, and finally etching this and larger ornaments by one or more baths of carbonate of ammonia and hydrofluoric acid.

For carrying my invention into practical use, the surface of the glass is first roughened or prepared chemically, so as to form a ground for the ornamentation to be etched thereon by the following operations: The chemical preparation of the surface may be either accomplished, if a whitish ground be desired, by etching with the well-known mixture of carbonate of ammonia and hydrofluoric acid, or, if a mere roughening without color be desired, by treating the surface with hydrofluoric acid. On this surface or ground an ornamentation in the nature of net-work, lattice, or similar light character, is produced by a transfer-sheet or pattern of lace, gauze, or any other perforated or cut fabric, which is first coated with varnish or other resist, and then smoothed down carefully upon the glass, so as to leave the impression of the pattern or sheet upon the same. The glass is then dipped into a bath of hydrofluoric acid when the prepared surface has received a white tinge or shade by the mixture of ammonia and hydrofluoric acid, or the glass is placed in a bath of the latter etching mixture when the ground has been produced by hydrofluoric acid.

The effects may thus be varied to a large extent, and the most delicate shades be obtained. The varnished lace or other transfer-pattern may also be laid directly on the glass, and treated with a bath of ammonia and hydrofluoric acid, obtaining thus colorless ornamentation and whitish ground, on which a second layer and more characteristic ornamentation is etched by suitable patterns, and treatment with a carbonate of ammonia and hydrofluoric-acid bath.

The larger ornamentation is also employed over the etched ground, and net-work ornamentation produced by the first-described processes, which may be repeated, as desired, so as to obtain thereby an almost unlimited variety of the most tasteful, elegant, and finished designs in a shorter time, and with less trouble and in cheaper manner, than heretofore.

Having thus described my invention, I claim as new and desire to secure by Letters Patent—

The process herein described of ornamenting a glass plate or other glass article, consisting essentially in first obtaining it with or producing upon its surface a dull ground, whereby it is rendered non-transparent, then transferring to such surface a pattern coated with varnish or other acid-resisting substance, then submitting the plate to the action of hydrofluoric acid, and, finally, producing on the deadened and etched surface, by suitable resists and repeated immersions in a bath composed of a mixture of the said acid and carbonate of ammonia, lace or other ornamental designs of a whitish hue, substantially as and for the purpose specified.

CHARLES J. CARTISSER.

Witnesses:
JAMES T. GRAHAM,
C. SEDGWICK.